(12) United States Patent
Zhu

(10) Patent No.: US 9,489,635 B1
(45) Date of Patent: Nov. 8, 2016

(54) METHODS AND SYSTEMS FOR VEHICLE PERCEPTION FEEDBACK TO CLASSIFY DATA REPRESENTATIVE OF TYPES OF OBJECTS AND TO REQUEST FEEDBACK REGARDING SUCH CLASSIFICATIONS

(71) Applicant: Google Inc., Mountain View, CA (US)

(72) Inventor: Jiajun Zhu, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 465 days.

(21) Appl. No.: 13/666,043

(22) Filed: Nov. 1, 2012

(51) Int. Cl.
*H04N 7/18* (2006.01)
*G06N 99/00* (2010.01)
*G06K 9/00* (2006.01)

(52) U.S. Cl.
CPC ......... *G06N 99/005* (2013.01); *G06K 9/00791* (2013.01)

(58) Field of Classification Search
CPC .... G06K 9/6254; G06K 9/00; G06K 9/4671; G06K 9/4676; G06K 9/6226; G06K 9/6228; G06T 7/2033; G08B 13/19608; G08B 13/19641; G08B 13/19645; G08B 13/19671; G08B 25/009; G08B 31/00; H04N 7/188
USPC .................... 348/148; 701/23, 504
See application file for complete search history.

(56) References Cited

U.S. PATENT DOCUMENTS

| 7,162,361 | B2 | 1/2007 | Heinrichs-Bartscher | |
| 8,195,394 | B1* | 6/2012 | Zhu | G01C 21/26 382/107 |
| 2009/0074249 | A1* | 3/2009 | Moed | G06K 9/00818 382/104 |
| 2009/0244291 | A1* | 10/2009 | Saptharishi et al. | 348/187 |
| 2010/0063664 | A1* | 3/2010 | Anderson | G05D 1/024 701/23 |
| 2010/0315505 | A1 | 12/2010 | Michalke et al. | |
| 2011/0228986 | A1 | 9/2011 | Seyffarth et al. | |
| 2012/0011142 | A1* | 1/2012 | Baheti et al. | 707/769 |

* cited by examiner

*Primary Examiner* — Jessica M Prince
(74) *Attorney, Agent, or Firm* — McDonnell Boehnen Hulbert & Berghoff LLP

(57) ABSTRACT

Aspects of the disclosure relate generally to methods and systems for improving object detection and classification. An example system may include a perception system and a feedback system. The perception system may be configured to receive data indicative of a surrounding environment of a vehicle, and to classify one or more portions of the data as representative of a type of object based on parameters associated with a machine learning classifier. The feedback system may be configured to request feedback regarding a classification of an object by the perception system based on a confidence level associated with the classification being below a threshold, and to cause the parameters associated with the machine classifier to be modified based on information provided in response to the request.

18 Claims, 8 Drawing Sheets

Computer Program Product 800

Signal Bearing Medium 802

Program Instructions 804

- receiving data about a surrounding environment of a vehicle from one or more sensors of the vehicle;

- determining one or more portions of the received data that are representative of an object;

- determining a type of the object based on features extracted from the one or more portions of the received data;

- determining a confidence level associated with the determination of the type of the object; and

- based on a comparison of the determined confidence level to a threshold, requesting via a user interface of the vehicle feedback regarding the determination of the type of the object.

| Computer Readable Medium 806 | Computer Recordable Medium 808 | Communications Medium 810 |

FIGURE 8

METHODS AND SYSTEMS FOR VEHICLE PERCEPTION FEEDBACK TO CLASSIFY DATA REPRESENTATIVE OF TYPES OF OBJECTS AND TO REQUEST FEEDBACK REGARDING SUCH CLASSIFICATIONS

BACKGROUND

Some vehicles are configured to operate in an autonomous mode in which the vehicle navigates through an environment with little or no input from a driver. Such a vehicle may include one or more sensors that are configured to sense information about the environment. The vehicle may use the sensed information to navigate through the environment. For example, if an output of the sensors is indicative that the vehicle is approaching an obstacle, the vehicle may navigate around the obstacle.

Various types of sensors of a vehicle may also be used in order to detect objects in a surrounding environment of the vehicle. For example, a vehicle may include lasers, sonar, radar, cameras, and other devices which scan and record data from the vehicle's surroundings. Once an object is detected, data received from these devices may then be used to identify what the object actually is (e.g., another vehicle, a pedestrian, an animal, etc.).

SUMMARY

In one example aspect, a system in a vehicle is disclosed. The system may include a perception system and a feedback system. The perception system may be configured to receive data indicative of a surrounding environment of the vehicle, and to classify one or more portions of the data as representative of a type of object based on parameters associated with a machine learning classifier. The feedback system may be configured to request feedback regarding a classification of an object by the perception system based on a confidence level associated with the classification being below a threshold, and to cause the parameters associated with the machine classifier to be modified based on information provided in response to the request.

In another example aspect, a method is disclosed that includes receiving data about a surrounding environment of a vehicle from one or more sensors of the vehicle. The method may further include determining, by a processor, one or more portions of the received data that are representative of an object. Further, the method may involve determining, by the processor, a type of the object based on features extracted from one or more portions of the received data and parameters associated with a machine learning classifier. Additionally, the method may include determining, by the processor, a confidence level associated with the determination of the type of object. According to the method, based on a comparison of the determined confidence level to a threshold, feedback regarding the determination of the type of the object may be requested via a user interface of the vehicle.

In another example aspect, a non-transitory computer-readable medium is disclosed having stored therein instructions executable by a computing device to cause the computing device to perform functions. The functions may include receiving data about a surrounding environment of a vehicle from one or more sensors of the vehicle. The functions may further include determining one or more portions of the received data that are representative of an object. Further, the functions may involve determining a type of the object based on features extracted from one or more portions of the received data and parameters associated with a machine learning classifier. Additionally, the functions may include determining a confidence level associated with the determination of the type of object. According to the functions feedback regarding the determination of the type of the object may be requested via a user interface of the vehicle based on a comparison of the determined confidence level to a threshold.

The foregoing summary is illustrative only and is not intended to be in any way limiting. In addition to the illustrative aspects, embodiments, and features described above, further aspects, embodiments, and features will become apparent by reference to the figures and the following detailed description.

BRIEF DESCRIPTION OF THE FIGURES

FIG. 8 is a schematic illustrating a conceptual partial view of an example computer program product that includes a computer program for executing a computer process on a computing device, arranged according to at least some embodiments presented herein.

DETAILED DESCRIPTION

Figure 1:
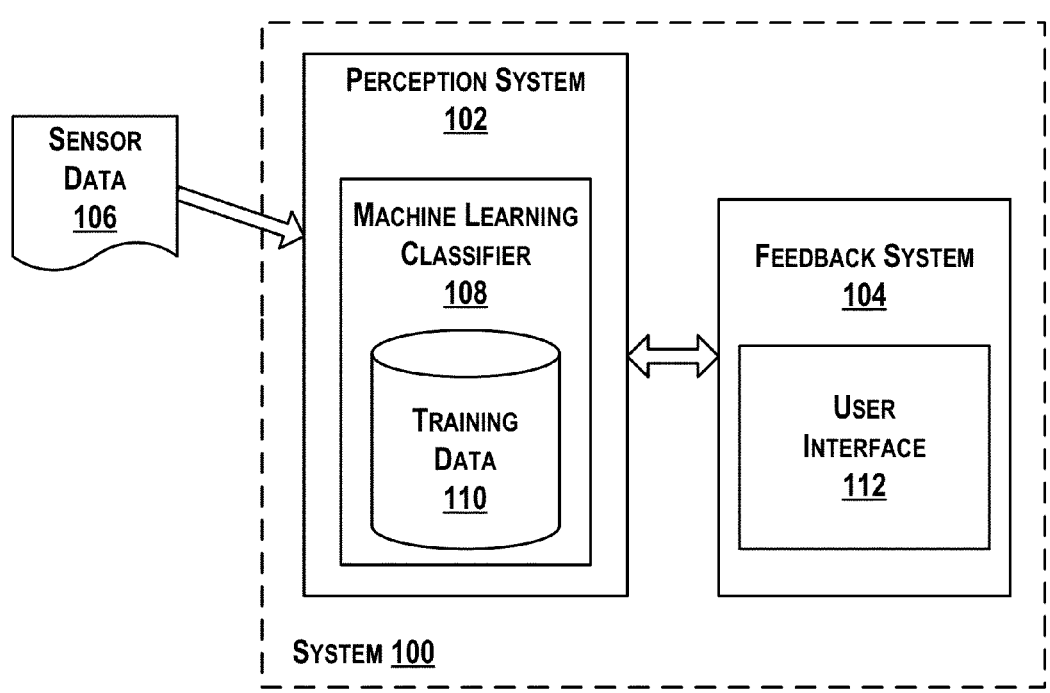
FIG. 1 is an example system for object detection and classification.

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure as generally describe herein, and illustrated in the figures, can be arranged, substituted, combined, separated, and designed in a wide variety of different configurations, all of which are explicitly contemplated herein.

In some instances, a vehicle, such as a vehicle configured to operate autonomously, may use many sensors, such as laser scanners, radars, and cameras to detect and track objects in a surrounding environment. Such objects may include other vehicles, pedestrians, bicycles, traffic signals, traffic signs, and animals, among other examples. Information from the sensors may be provided to a vehicle perception system that is configured to detect and track the objects. For instance, the vehicle perception system may estimate a position of an object, distance to the object, speed of the object, or other characteristic based on the information from the sensors. According to some example described systems and methods, a vehicle perception system may be modified over time based on feedback provided from passengers or drivers of a vehicle.

As an example, a system in a vehicle may include a perception system and a feedback system. The perception system may be configured to receive data that is indicative of a surrounding environment of the vehicle and to classify one or more portions of the data as representative of a type of object. For example, the perception system may be configured to classify portions of data as representative of a vehicle, an animal, a traffic signal, a traffic sign, a bicycle, etc., based on parameters that are associated with a machine learning classifier. In one instance, the machine learning classifier may be a decision tree classifier; however, other examples are also possible.

The feedback system may be configured to request feedback regarding a classification of an object by the perception system based on a confidence level associated with the classification being below a threshold. For instance, if the perception system determines a confidence level that is below the threshold, the feedback system may be configured to prompt a user of the vehicle to confirm that an object was correctly classified or provide additional information about an object that the perception system was unable to classify. Based on information provided in response to the request, the feedback system may then be configured to cause the parameters associated with the machine learning classifier to be modified. For instance, if the object was correctly classified by the machine learning classifier, as indicated by the provided information, the portions of data that are representative of the object may be added to training data that is utilized to determine the parameters for the machine learning classifier. As another example, if the provided information indicates that an object was incorrectly classified by the perception system, the portions of data may be flagged for further review by a system administrator.

Thus, in some examples, the perception system may be designed to continually improve an ability to classify objects over time. In an instance in which limited training data is available, adding observed portions of data that have been confirmed as being representative of various types of objects to training data that is utilized by the perception system may result in an improved perception system that can more robustly classify objects.

Although examples herein are described with respect to a vehicle that is configured to operate autonomously, the examples are not meant to be limiting. For instance, the described methods and systems may also be applicable to driver assistance systems designed to help a driver in the driving process. Other examples are also possible.

Referring now the Figures, FIG. 1 is an example system 100 for object detection and classification. For instance, the system 100 may be a system or part of a system of a vehicle, such as the vehicle 600 described with respect to FIG. 6. The system 100 may include a perception system 102 and a feedback system 104. In one example, the perception system 102 may be configured to receive sensor data 106 that is indicative of a surrounding environment of a vehicle, and to classify one or more portions of the data as representative of a type of object. For example, the perception system 102 may receive sensor data 106 from lasers, sonar, radar, cameras, and other devices which can scan and record data from a vehicle's surroundings.

As an example, a laser scan may yield a collection of points in space, referred to herein as a point cloud. Each point of the point cloud may represent a distance to a surface of an object in the environment. The perception system 102 may then be configured to identify a cluster within a point cloud as an object, and take into account additional data of the sensor data 106, in addition to the point cloud data, to classify the object as a certain type of object. The perception system 102 may consider one or more indications such as a point cloud density, surface normal distribution, object height, object radius, camera image color, object shape, object moving speed, or other indications associated with the object to determine the type of object. In one example, based on the indications, a machine learning classifier 108 may be used to classify the type of object.

The machine learning classifier 108 may rely on a set of training data 110 to determine patterns or predictions of characteristics of various classifications of objects. The training data 110 may include portions of data that are known to be representative of given objects (or types of objects). For instance, the training data 110 may include multiple instances of sensor data that have been labeled as being data associated with a given type of object.

In one instance, the machine learning classifier 108 may be trained on the training data 110 in order to determine parameters of sensor data that are associated with each type of object. For example, the machine learning classifier 108 may extract features such as point cloud density, surface normal distribution, object height, object radius, camera image color, object shape, object moving speed, or other features from each instance of sensor data in the training data 110. Based on the extracted features, the machine learning classifier 108 may be configured to determine parameters of the extracted features that enable the machine learning classifier 108 to classify a new instance of sensor data as being a type of object. As an example, the machine learning classifier 108 may be a decision tree classifier that yields a classification tree that may be used for classifying the sensor data 106. In other examples, the machine learning classifier 108 may be another type of machine learning classifier.

The machine learning classifier 108 may also be configured to determine a confidence level associated with a classification of the portion(s) of sensor data 106. The confidence level may be a metric that is indicative of a probability that the sensor data 106 is a given type of object. For example, the confidence level may be determined based on a relationship between values of extracted features of the portion(s) of sensor data 106 and learned parameters of the machine learning classifier 108 that are expected for various types of objects.

The feedback system 104 may be configured to request feedback regarding a classification of an object by the perception system. In one instance, the feedback system may be configured to request feedback regarding the classification of an object when a confidence level determined by the perception system 102 is a below a threshold. For example, if the perception system 100 is unsure of what type of object a portion of data represents, the feedback system 104 may request feedback from a passenger or driver of the vehicle.

The feedback system 104 may be configured to request feedback via a user interface 112. In one example, the user interface 114 may be a display interface. For instance, the display interface may be provided on a touchscreen display of the vehicle. However, other types of interfaces, such as a speech interface are also contemplated.

In some examples, the feedback system 104 may also be configured to cause parameters associated with the machine learning classifier 108 to be modified based on information provided in response to a request for feedback. In one scenario, the information provided in response to a request may be an indication of a type of object. If the indication of the type of object corresponds to a classification of the object as determined by the perception system 102, the feedback system 104 may be configured to add one or more portions of the sensor data 106 to the training data 110. For instance, the feedback system may be configured to add the portions of sensor data 106 that are representative of the object to the training data 110 and cause the machine learning classifier 108 to relearn the parameters that are used for classification. If the indication of the type of the object provided in response to the request does not correspond to the determined classification of the object, the feedback system 104 may be configured to store the sensor data 106 or portion(s) of the sensor data 106 in a database, and flag the sensor data 106 and extracted features from one or more portions of the sensor data 106 for review by a system administrator. The system administrator may then be able to review the extracted features and modify the parameters used by the machine learning classifier 108 if necessary.

In another example, the feedback system 104 may also be configured to receive feedback when the perception system is confident in a classification of portions of the sensor data 106 as a type of object. For example, if the vehicle stops for a "false" object that the perception system 102 has incorrectly identified as an obstacle in a path of the vehicle, a user may be able provide feedback via the user interface 112 indicating that the path is clear. For instance, a user may push a button via the user interface 112 to indicate that an object is not present in the path and the vehicle should continue. As another example, if the vehicle stops for a traffic signal that the vehicle has incorrectly determined to be red, a user may provide feedback via the user interface 112 noting the incorrect classification of the state of the traffic signal. Again, the provided feedback and any associated portion(s) of sensor data may then be stored for review by a system administrator.

Figure 2:
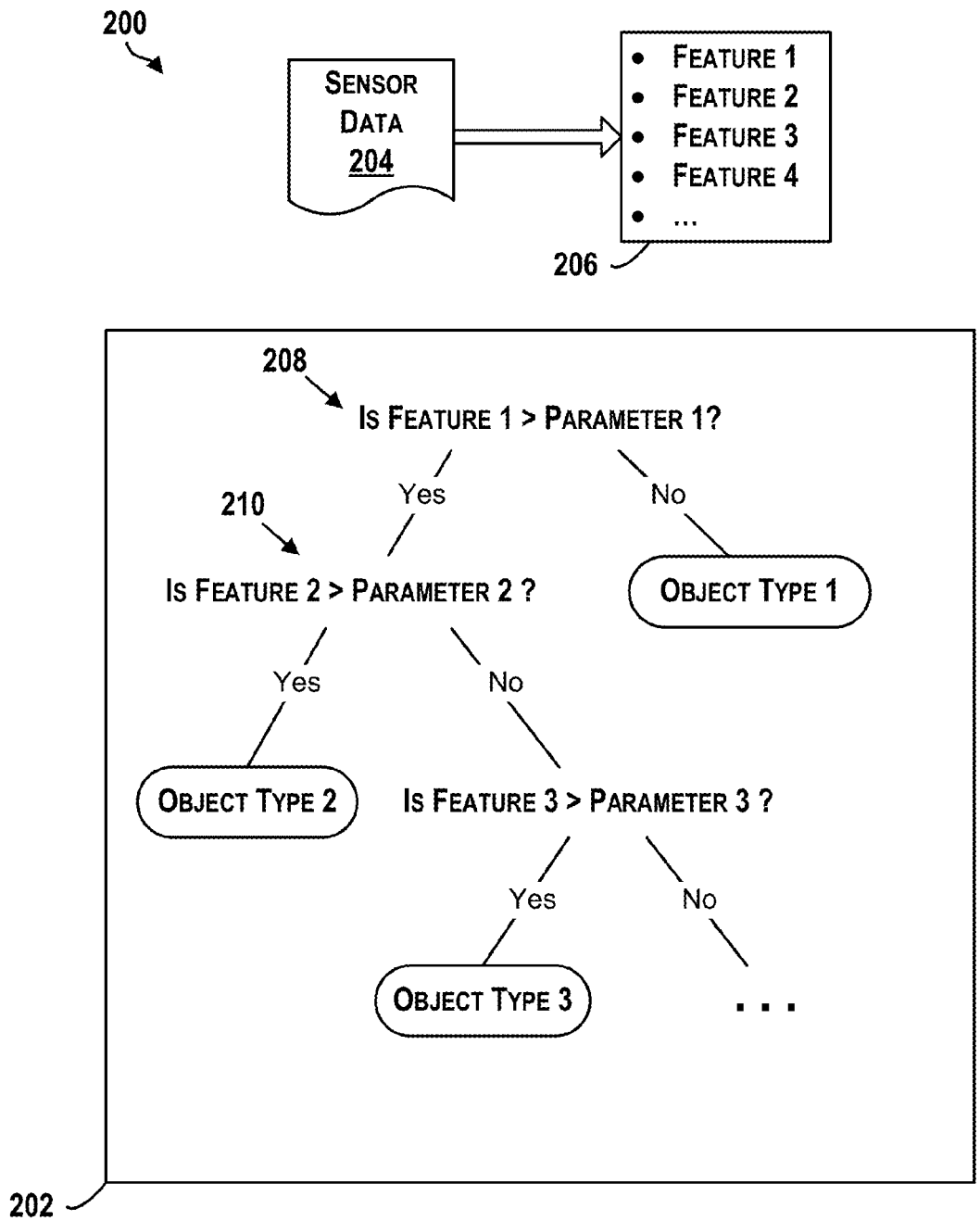
FIG. 2 is a conceptual illustration of a classification of an object in accordance with an embodiment.

FIG. 2 is a conceptual illustration 200 of a classification of an object in accordance with an embodiment. As described above, in one example, the machine learning classifier may be a decision tree classifier. The decision tree classifier may data mine a set of training data to determine a classification tree 202 that may be used to classify a portion of sensor data 204. For instance, the decision tree classifier may learn the classification tree 202 by analyzing class labeled instances of extracted features to determine parameters that that split the training data into homogenous subsets of extracted features (e.g., subsets where each extracted feature is the same type of object).

The resulting classification tree 202 may be a flow chart like structure that may be used to classify the portion of sensor data 204. For example, each internal (or non-leaf) node denotes a test on an extracted feature and each branch represents an outcome of the test. Each leaf (or terminal) node indicates a class label (i.e., type of object).

In the conceptual illustration 200, extracted features 206 may be determined based on the sensor data 204. The extracted features may then be compared to parameters of the classification tree 202 to classify the portion of sensor data 204 as a type of object. For example, if at internal node 208 a first extracted feature is determined to be less than a first parameter, the portion of sensor data 204 may be determined to be a first type of object. However, if it is determined that the first extracted feature is greater than the first parameter, a second a determination may be made at a second internal node 210, and so on. Note that the conceptual illustration 200 provides one example of a classification tree. In other examples, a classification tree may be more or less complex. Similarly, multiple separate classification trees may be used to classify an object.

Figure 3:
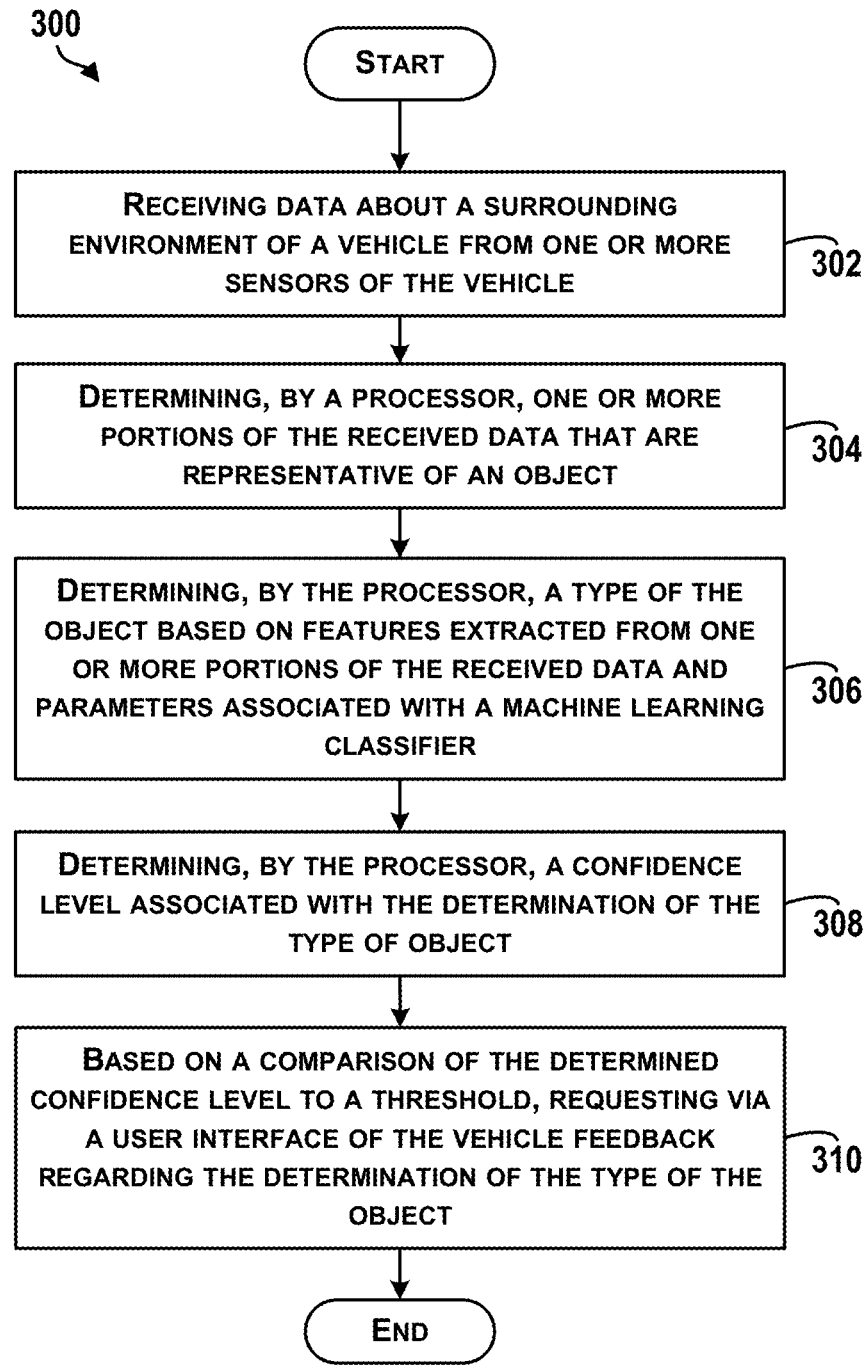
FIG. 3 is a block diagram of an example method for determining feedback associated with a classification of an object.

FIG. 3 is a block diagram of an example method 300 for determining feedback associated with a classification of an object. Method 300 shown in FIG. 3 presents an embodiment of a method that could be used with the vehicles described herein, for example, and may be performed by a vehicle or components of a vehicle, or more generally by a computing device or system (e.g., the system 100 of FIG. 1). Method 300 may include one or more operations, functions, or actions as illustrated by one or more of blocks 302-310. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

In addition, for the method 300 and other processes and methods disclosed herein, the block diagram shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer-readable medium, such as, for example, a storage device including a disk or hard drive. The computer-readable medium may include a non-transitory computer-readable medium, for example, such as computer-readable media that store data for short periods of time like register memory, processor cache, and Random Access Memory (RAM). The computer-readable medium may also include non-transitory media, such as secondary or persistent long term storage, like read only memory (ROM), optical or magnetic disks, and compact-disc read only memory (CD-ROM), for example. The computer-readable media may also be any other volatile or non-volatile storage systems. The computer-readable medium may be considered a computer-readable storage medium, a tangible storage device, or other article of manufacture, for example.

In addition, for the method 300 and other processes and methods disclosed herein, each block may represent circuitry that is configured to perform the specific logical functions in the process.

As shown, initially, at block 302, the method 300 includes receiving data about a surrounding environment of a vehicle from one or more sensors of the vehicle. In one example, a vehicle, such as a vehicle configured to operate in an autonomous mode, may be equipped with a three-dimensional (3D) scanning device (e.g., a 3D laser scanner) that may be configured to determine distances to surfaces of objects in an environment. In one instance, the 3D laser scanner may be an active scanner that uses laser light to probe a surface. For example, the 3D laser scanner may take the form of a time-of-flight laser rangefinder or light detection and ranging (LIDAR) system that finds the distance to a surface by timing the round-trip time of a pulse of light. A laser may emit a pulse of light and the amount of time before the reflected light is detected by a detector may be timed. Given the speed of light and the determined amount of time, a distance to a surface that the emitted light reflected off of may be calculated.

Additionally, a view direction of the laser rangefinder or LIDAR system may be changed by rotating the laser rangefinder itself or by using a system of rotating mirrors. For example, the laser rangefinder or LIDAR system may be configured to rotationally scan an environment at a fixed time interval. In one instance, the view direction of the laser rangefinder or LIDAR system may be configured to rotate such that one rotational scan (i.e., a 360 degree scan of an environment) lasts 300 milliseconds. Other example rotational speeds and configurations are also possible.

The vehicle may also be equipped with other types of sensors that also provide data about the surrounding environment of the vehicle. For example, the vehicle may include radars, cameras, sonar, or other types of sensing devices. Data from one or any combination of the sensors of the vehicle may be provided.

At block 304, the method 300 includes determining, by a processor, one or more portions of the received data that are representative of an object. In one example, a cluster within a point cloud may be identified as data that may represent an object based on a size, shape, density, location, or other property of the cluster.

At block 306, the method 300 includes determining, by the processor, a type of the object based on features extracted from the one or more portions of the received data and parameters associated with a machine learning classifier. The processor may take into account additional data of the sensor data, in addition to the point cloud data, to classify the object as a certain type of object. For example, the processor may consider one or more extracted features such as a point cloud density, surface normal distribution, object height, object radius, camera image color, object shape, object moving speed, or other indications associated with the object to determine the type of object. Based on the indications, a machine learning classifier may be used to classify the type of object. For example, the machine learning classifier may include one or more classification trees.

At block 308, the method 300 includes determining, by the processor, a confidence level associated with the determination of the type of object. In one instance, the processor may determine the confidence level based on a relationship between extracted features of the portion of received data and expected characteristics for extracted features within the object class. For example, if the processor determines that the object is an animal, the processor may compare one or more of the extracted features to an average of one or more of the extracted features in the training data that are known to be representative of an animal. As an example, if an object height for the object is outside of an expected range for animals but other extracted features fall within expected ranges for animals, a low confidence level (e.g., 55%) may be determined. In another example, if all of the extracted features are within an expected range for extracted features of an animal, a high confidence level (e.g., 85%) may be determined.

At block 310, the method 300 includes based on a comparison of the determined confidence level to a threshold, requesting via a user interface of the vehicle, feedback regarding the determination of the type of the object. For example, if the confidence level is below a threshold, feedback regarding the classification of the object may be requested via a display interface, as described with reference to FIGS. 4A and 4B.

Figure 4A:
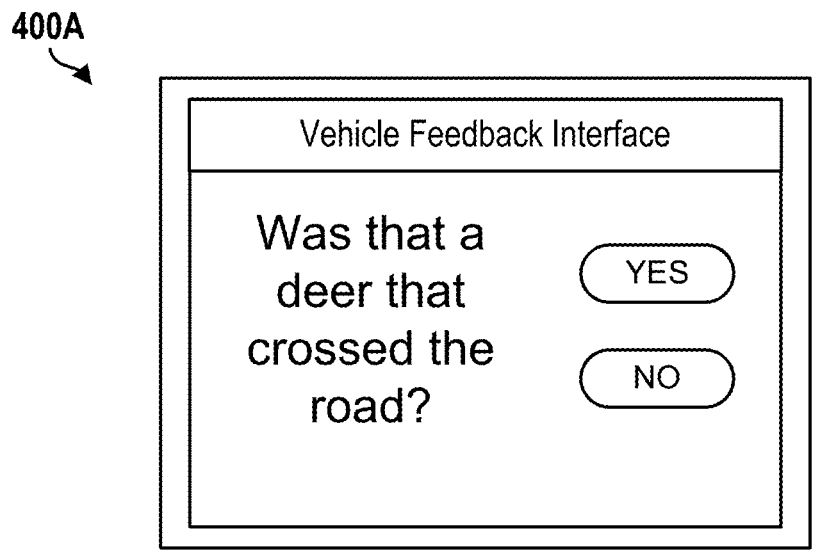
FIGS. 4A-4B are example conceptual illustrations of feedback requests.
Figure 4B:
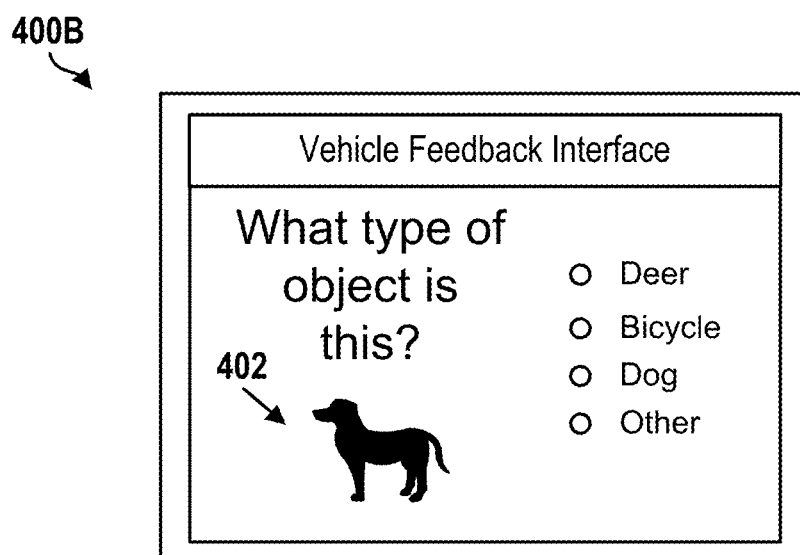

FIGS. 4A-4B are example conceptual illustrations 400A, 400B of feedback requests. FIG. 4A shows an example of a feedback request that may be provided via a display interface of a vehicle. As shown in FIG. 4A, if a perception system of a vehicle determines a confidence level for a classification of an object that is below a threshold, a feedback system may request confirmation of the classification. For example, if the perception system determines that an object crossing a path of the vehicle is a deer, the display interface may provide a question to a passenger or driver of the vehicle requesting confirmation about the classification of the object as a deer. The passenger or driver may then provide information confirming or negating the classification.

As shown in FIG. 4B, in other examples, the feedback system may ask a user to classify an object. For instance, an image 402 of the object that was captured by a camera of the vehicle may be presented to the user. The user may then provide an indication of the type of the object via the display interface.

In one example, based on information provided in response to a feedback request, the method 300 may further include causing parameters associated with the machine learning classifier to be modified. For example, FIG. 5 describes actions that may be carried out by the processor in response to information that is provided by a passenger or driver of the vehicle.

Figure 5:
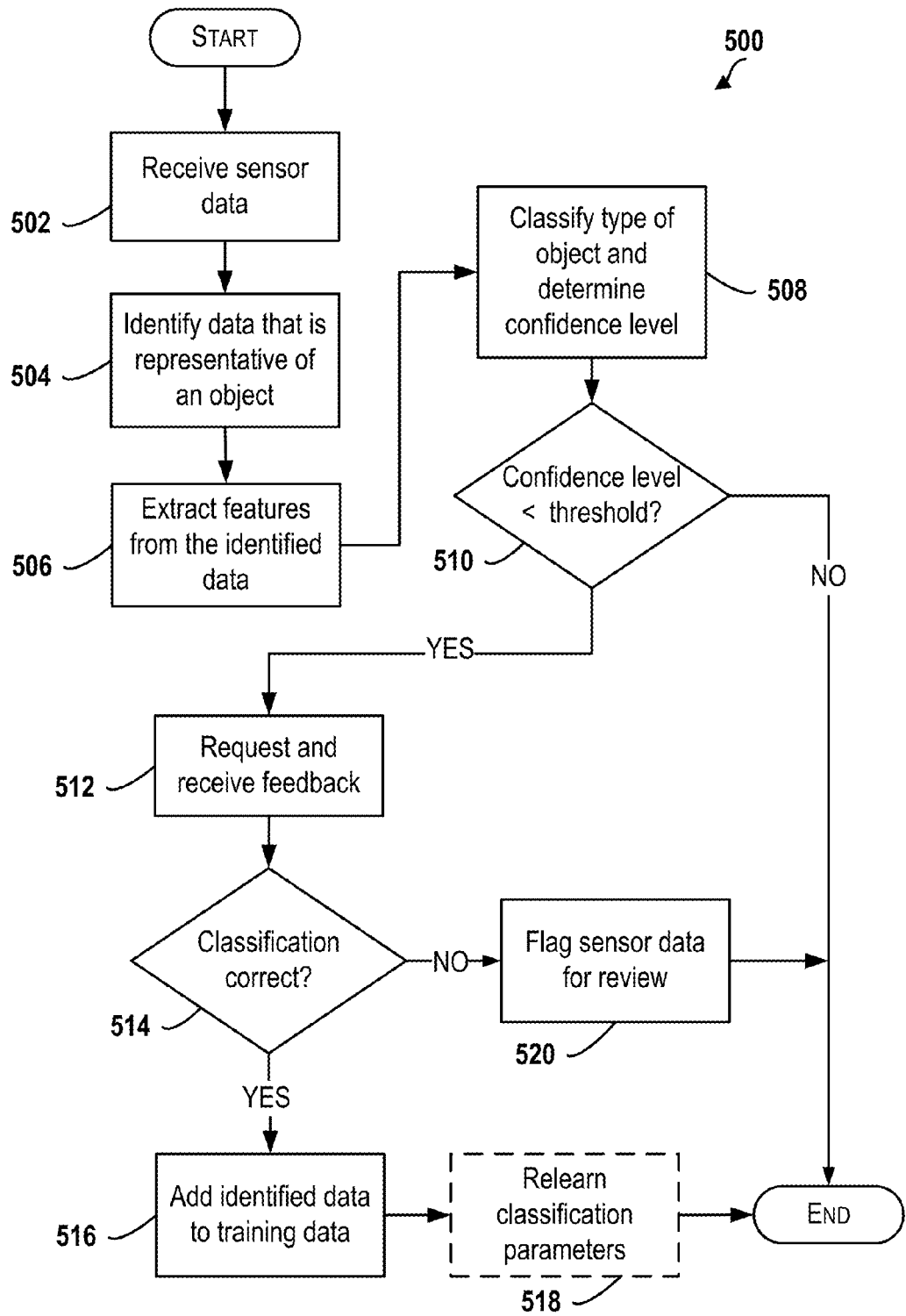
FIG. 5 is an example flow diagram in accordance with an embodiment.

FIG. 5 is an example flow diagram 500 in accordance with an embodiment. As shown in FIG. 5, initially at block 502, sensor data of a surrounding environment of a vehicle may be received. At blocks 504 and 506 respectively, data within the sensor data that is representative of an object may be identified, and features may be extracted based on the identified data. Additionally, at block 508, a machine learning classifier may be used to classify a type of the object and determine a confidence level associated with the classification.

At block 510, a determination of whether or not to request feedback may be made. If the confidence level is below a threshold, at block 512, feedback may be requested. Based on information provided in response to the feedback, an additional determination may be made at block 514.

If at block 514 it is determined that the classification was correct (e.g., if information provided in response to the request at block 512 confirms the classification or provides an indication of a type of object that corresponds to the determined type), at block 516, the identified data may be added to training data that is used by the machine learning classifier. Optionally, at block 518, the machine learning classifier may relearn parameters used to classify the type of object. For example, the machine learning classifier may relearn parameters of a classification tree after a certain number of instances of data have been added to the training data (e.g., once 10 instances of data have been added to the training data).

Alternatively, if at block 514 it is determined that the classification was incorrect, the identified data may be stored and flagged for review at block 520 so that a system administrator may modify the parameters used by the machine learning classifier for classification. For example, the sensor data may be uploaded or otherwise communicated to a server in a network along with an indication of the information provided in response to the request for feedback.

Systems in which example embodiments of the above example methods may be implemented will now be described in greater detail. In general, an example system may be implemented in or may take the form of a vehicle. The vehicle may take a number of forms, including, for example, automobiles, cars, trucks, motorcycles, buses, boats, airplanes, helicopters, lawn mowers, earth movers, snowmobiles, recreational vehicles, amusement park vehicles, farm equipment, construction equipment, trams, golf carts, trains, and trolleys. Other vehicles are possible as well.

Further, another example system may take the form of non-transitory computer-readable medium, which has program instructions stored thereon that are executable by at least one processor to provide the functionality described herein. An example system may also take the form of a vehicle or a subsystem of a vehicle that includes such a non-transitory computer-readable medium having such program instructions stored thereon.

Figure 6:
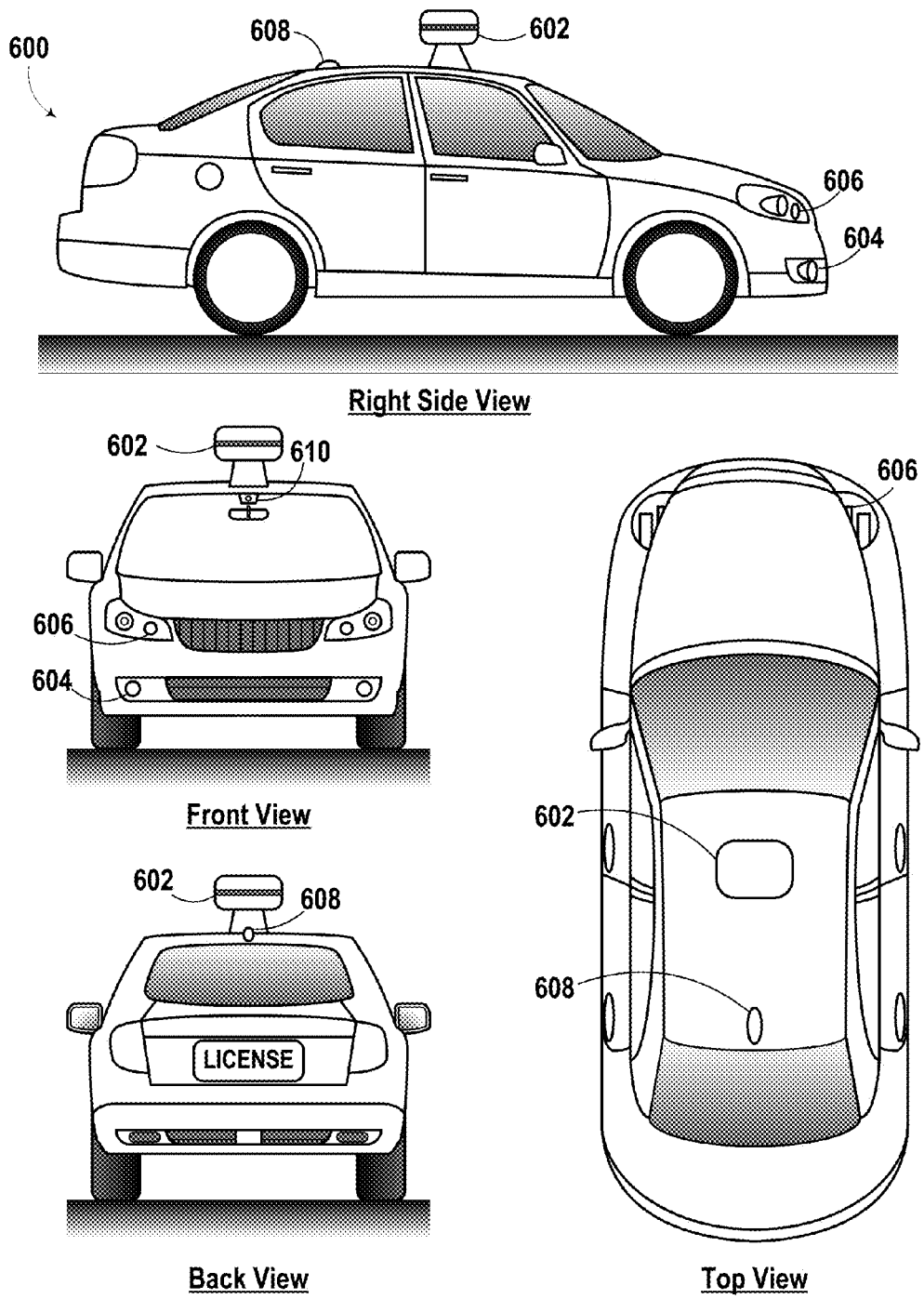
FIG. 6 illustrates an example vehicle, in accordance with an embodiment.

FIG. 6 illustrates an example vehicle 600, in accordance with an embodiment. In particular, FIG. 6 shows a Right Side View, Front View, Back View, and Top View of the vehicle 600. Although vehicle 600 is illustrated in FIG. 6 as a car, other embodiments are possible. For instance, the vehicle 600 could represent a truck, a van, a semi-trailer truck, a motorcycle, a golf cart, an off-road vehicle, or a farm vehicle, among other examples. As shown, the vehicle 600 includes a first sensor unit 602, a second sensor unit 604, a third sensor unit 606, a wireless communication system 608, and a camera 610.

Each of the first, second, and third sensor units 602-606 may include any combination of global positioning system sensors, inertial measurement units, radio detection and ranging (RADAR) units, laser rangefinders, light detection and ranging (LIDAR) units, cameras, and acoustic sensors. Other types of sensors are possible as well.

While the first, second, and third sensor units 602 are shown to be mounted in particular locations on the vehicle 600, in some embodiments the sensor unit 602 may be mounted elsewhere on the vehicle 600, either inside or outside the vehicle 600. Further, while only three sensor units are shown, in some embodiments more or fewer sensor units may be included in the vehicle 600.

In some embodiments, one or more of the first, second, and third sensor units 602-606 may include one or more movable mounts on which the sensors may be movably mounted. The movable mount may include, for example, a rotating platform. Sensors mounted on the rotating platform could be rotated so that the sensors may obtain information from each direction around the vehicle 600. Alternatively or additionally, the movable mount may include a tilting platform. Sensors mounted on the tilting platform could be tilted within a particular range of angles and/or azimuths so that the sensors may obtain information from a variety of angles. The movable mount may take other forms as well.

Further, in some embodiments, one or more of the first, second, and third sensor units 602-606 may include one or more actuators configured to adjust the position and/or orientation of sensors in the sensor unit by moving the sensors and/or movable mounts. Example actuators include motors, pneumatic actuators, hydraulic pistons, relays, solenoids, and piezoelectric actuators. Other actuators are possible as well.

The wireless communication system 608 may be any system configured to wirelessly couple to one or more other vehicles, sensors, or other entities, either directly or via a communication network. To this end, the wireless communication system 608 may include an antenna and a chipset for communicating with the other vehicles, sensors, or other entities either directly or via a communication network. The chipset or wireless communication system 608 in general may be arranged to communicate according to one or more other types of wireless communication (e.g., protocols) such as Bluetooth, communication protocols described in IEEE 802.11 (including any IEEE 802.11 revisions), cellular technology (such as GSM, CDMA, UMTS, EV-DO, WiMAX, or LTE), Zigbee, dedicated short range communications (DSRC), and radio frequency identification (RFID) communications, among other possibilities. The wireless communication system 608 may take other forms as well.

While the wireless communication system 608 is shown positioned on a roof of the vehicle 600, in other embodiments the wireless communication system 608 could be located, fully or in part, elsewhere.

The camera 610 may be any camera (e.g., a still camera, a video camera, etc.) configured to capture images of the environment in which the vehicle 600 is located. To this end, the camera 610 may be configured to detect visible light, or may be configured to detect light from other portions of the spectrum, such as infrared or ultraviolet light. Other types of cameras are possible as well. The camera 610 may be a two-dimensional detector, or may have a three-dimensional spatial range. In some embodiments, the camera 610 may be, for example, a range detector configured to generate a two-dimensional image indicating a distance from the camera 610 to a number of points in the environment. To this end, the camera 610 may use one or more range detecting techniques. For example, the camera 610 may use a structured light technique in which the vehicle 600 illuminates an object in the environment with a predetermined light pattern, such as a grid or checkerboard pattern and uses the camera 610 to detect a reflection of the predetermined light pattern off the object. Based on distortions in the reflected light pattern, the vehicle 600 may determine the distance to the points on the object. The predetermined light pattern may comprise infrared light, or light of another wavelength. As another example, the camera 610 may use a laser scanning technique in which the vehicle 600 emits a laser and scans across a number of points on an object in the environment. While scanning the object, the vehicle 600 uses the camera 610 to detect a reflection of the laser off the object for each point. Based on a length of time it takes the laser to reflect off the object at each point, the vehicle 600 may determine the distance to the points on the object. As yet another example, the camera 610 may use a time-of-flight technique in which the vehicle 600 emits a light pulse and uses the camera 610 to detect a reflection of the light pulse off an object at a number of points on the object. In particular, the camera 610 may include a number of pixels, and each pixel may detect the reflection of the light pulse from a point on the object. Based on a length of time it takes the light pulse to reflect off the object at each point, the vehicle 600 may determine the distance to the points on the object. The light pulse may be a laser pulse. Other range detecting techniques are possible as well, including stereo triangulation, sheet-of-light triangulation, interferometry, and coded aperture techniques, among others. The camera 610 may take other forms as well.

In some embodiments, the camera 610 may include a movable mount and/or an actuator, as described above, that are configured to adjust the position and/or orientation of the camera 610 by moving the camera 610 and/or the movable mount.

While the camera 610 is shown to be mounted inside a front windshield of the vehicle 600, in other embodiments the camera 610 may be mounted elsewhere on the vehicle 600, either inside or outside the vehicle 600.

The vehicle 600 may include one or more other components in addition to or instead of those shown.

Figure 7:
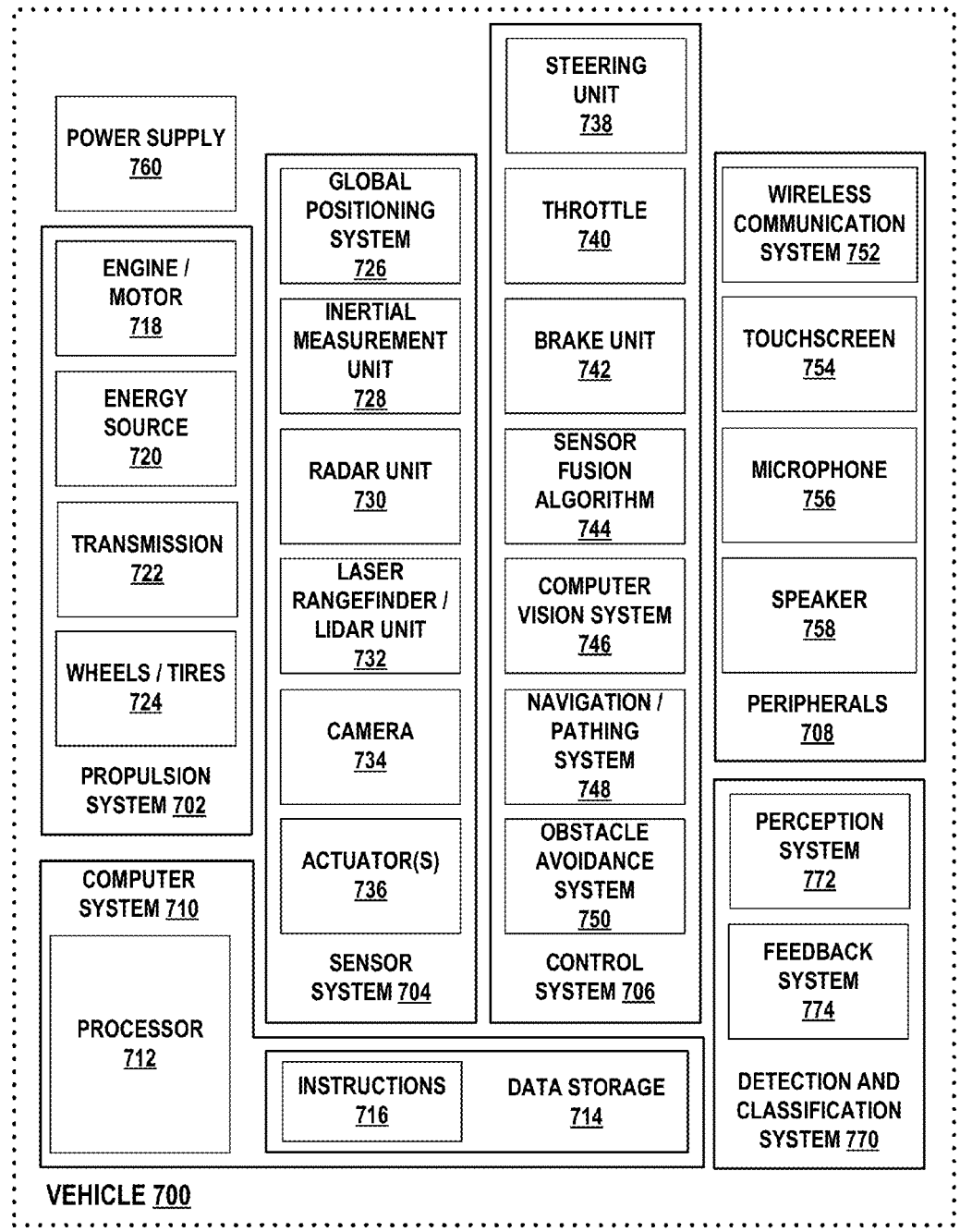
FIG. 7 is a simplified block diagram of an example vehicle, in accordance with an embodiment.

FIG. 7 is a simplified block diagram of an example vehicle 700, in accordance with an embodiment. The vehicle 700 may, for example, be similar to the vehicle 600 described above in connection with FIG. 6. The vehicle 700 may take other forms as well.

As shown, the vehicle 700 includes a propulsion system 702, a sensor system 704, a control system 706, peripherals 708, and a computer system 710 including a processor 712, data storage 714, and instructions 716. In other embodiments, the vehicle 700 may include more, fewer, or different systems, and each system may include more, fewer, or different components. Additionally, the systems and components shown may be combined or divided in any number of ways.

The propulsion system 702 may be configured to provide powered motion for the vehicle 700. As shown, the propulsion system 702 includes an engine/motor 718, an energy source 720, a transmission 722, and wheels/tires 724.

The engine/motor 718 may be or include any combination of an internal combustion engine, an electric motor, a steam engine, and a Stirling engine. Other motors and engines are possible as well. In some embodiments, the propulsion system 702 could include multiple types of engines and/or motors. For instance, a gas-electric hybrid car could include a gasoline engine and an electric motor. Other examples are possible.

The energy source 720 may be a source of energy that powers the engine/motor 718 in full or in part. That is, the engine/motor 718 may be configured to convert the energy source 720 into mechanical energy. Examples of energy sources 720 include gasoline, diesel, propane, other compressed gas-based fuels, ethanol, solar panels, batteries, and other sources of electrical power. The energy source(s) 720 could additionally or alternatively include any combination of fuel tanks, batteries, capacitors, and/or flywheels. In some embodiments, the energy source 720 may provide energy for other systems of the vehicle 700 as well.

The transmission 722 may be configured to transmit mechanical power from the engine/motor 718 to the wheels/tires 724. To this end, the transmission 722 may include a gearbox, clutch, differential, drive shafts, and/or other elements. In embodiments where the transmission 722 includes drive shafts, the drive shafts could include one or more axles that are configured to be coupled to the wheels/tires 724.

The wheels/tires 724 of vehicle 700 could be configured in various formats, including a unicycle, bicycle/motorcycle, tricycle, or car/truck four-wheel format. Other wheel/tire formats are possible as well, such as those including six or more wheels. In any case, the wheels/tires 724 of vehicle 724 may be configured to rotate differentially with respect to other wheels/tires 724. In some embodiments, the wheels/tires 724 may include at least one wheel that is fixedly attached to the transmission 722 and at least one tire coupled to a rim of the wheel that could make contact with the driving surface. The wheels/tires 724 may include any combination of metal and rubber, or combination of other materials.

The propulsion system 702 may additionally or alternatively include components other than those shown.

The sensor system 704 may include a number of sensors configured to sense information about an environment in which the vehicle 700 is located, as well as one or more actuators 736 configured to modify a position and/or orientation of the sensors. As shown, the sensors of the sensor system 704 include a Global Positioning System (GPS) 726, an inertial measurement unit (IMU) 728, a RADAR unit 730, a laser rangefinder and/or LIDAR unit 732, and a camera 734. The sensor system 704 may include additional sensors as well, including, for example, sensors that monitor internal systems of the vehicle 700 (e.g., an $O_2$ monitor, a fuel gauge, an engine oil temperature, etc.). Other sensors are possible as well.

The GPS 726 may be any sensor configured to estimate a geographic location of the vehicle 700. To this end, the GPS 726 may include a transceiver configured to estimate a position of the vehicle 700 with respect to the Earth. The GPS 726 may take other forms as well.

The IMU 728 may be any combination of sensors configured to sense position and orientation changes of the vehicle 700 based on inertial acceleration. In some embodiments, the combination of sensors may include, for example, accelerometers and gyroscopes. Other combinations of sensors are possible as well.

The RADAR 730 unit may be any sensor configured to sense objects in the environment in which the vehicle 700 is located using radio signals. In some embodiments, in addition to sensing the objects, the RADAR unit 730 may additionally be configured to sense the speed and/or heading of the objects.

Similarly, the laser rangefinder or LIDAR unit 732 may be any sensor configured to sense objects in the environment in which the vehicle 700 is located using lasers. In particular, the laser rangefinder or LIDAR unit 732 may include a laser source and/or laser scanner configured to emit a laser and a detector configured to detect reflections of the laser. The laser rangefinder or LIDAR 732 may be configured to operate in a coherent (e.g., using heterodyne detection) or an incoherent detection mode.

The camera 734 may be any camera (e.g., a still camera, a video camera, etc.) configured to capture images of the environment in which the vehicle 700 is located. To this end, the camera may take any of the forms described above.

The sensor system 704 may additionally or alternatively include components other than those shown.

The control system 706 may be configured to control operation of the vehicle 700 and its components. To this end, the control system 706 may include a steering unit 738, a throttle 740, a brake unit 742, a sensor fusion algorithm 744, a computer vision system 746, a navigation or pathing system 748, and an obstacle avoidance system 750.

The steering unit 738 may be any combination of mechanisms configured to adjust the heading of vehicle 700.

The throttle 740 may be any combination of mechanisms configured to control the operating speed of the engine/motor 718 and, in turn, the speed of the vehicle 700.

The brake unit 742 may be any combination of mechanisms configured to decelerate the vehicle 700. For example, the brake unit 742 may use friction to slow the wheels/tires 724. As another example, the brake unit 742 may convert the kinetic energy of the wheels/tires 724 to electric current. The brake unit 742 may take other forms as well.

The sensor fusion algorithm 744 may be an algorithm (or a computer program product storing an algorithm) configured to accept data from the sensor system 704 as an input. The data may include, for example, data representing information sensed at the sensors of the sensor system 704. The sensor fusion algorithm 744 may include, for example, a Kalman filter, a Bayesian network, or another algorithm. The sensor fusion algorithm 744 may further be configured to provide various assessments based on the data from the sensor system 704, including, for example, evaluations of individual objects and/or features in the environment in which the vehicle 700 is located, evaluations of particular situations, and/or evaluations of possible impacts based on particular situations. Other assessments are possible as well.

The computer vision system 746 may be any system configured to process and analyze images captured by the camera 734 in order to identify objects and/or features in the environment in which the vehicle 700 is located, including, for example, traffic signals and obstacles. To this end, the computer vision system 746 may use an object recognition algorithm, a Structure from Motion (SFM) algorithm, video tracking, or other computer vision techniques. In some embodiments, the computer vision system 746 may additionally be configured to map the environment, track objects, estimate the speed of objects, etc.

The navigation and pathing system 748 may be any system configured to determine a driving path for the vehicle 700. The navigation and pathing system 748 may additionally be configured to update the driving path dynamically while the vehicle 700 is in operation. In some embodiments, the navigation and pathing system 748 may be configured to incorporate data from the sensor fusion algorithm 744, the GPS 726, and one or more predetermined maps so as to determine the driving path for vehicle 700.

The obstacle avoidance system 750 may be any system configured to identify, evaluate, and avoid or otherwise negotiate obstacles in the environment in which the vehicle 700 is located.

The control system 706 may additionally or alternatively include components other than those shown.

Peripherals 708 may be configured to allow the vehicle 700 to interact with external sensors, other vehicles, and/or a user. To this end, the peripherals 708 may include, for example, a wireless communication system 752, a touchscreen 754, a microphone 756, and/or a speaker 758.

The wireless communication system 752 may take any of the forms described above.

The touchscreen 754 may be used by a user to input commands to the vehicle 700. To this end, the touchscreen 754 may be configured to sense at least one of a position and a movement of a user's finger via capacitive sensing, resistance sensing, or a surface acoustic wave process, among other possibilities. The touchscreen 754 may be capable of sensing finger movement in a direction parallel or planar to the touchscreen surface, in a direction normal to the touchscreen surface, or both, and may also be capable of sensing a level of pressure applied to the touchscreen surface. The touchscreen 754 may be formed of one or more translucent or transparent insulating layers and one or more translucent or transparent conducting layers. The touchscreen 754 may take other forms as well.

The microphone 756 may be configured to receive audio (e.g., a voice command or other audio input) from a user of the vehicle 700. Similarly, the speakers 758 may be configured to output audio to the user of the vehicle 700.

The peripherals 708 may additionally or alternatively include components other than those shown.

The computer system 710 may be configured to transmit data to and receive data from one or more of the propulsion system 702, the sensor system 704, the control system 706, and the peripherals 708. To this end, the computer system 710 may be communicatively linked to one or more of the propulsion system 702, the sensor system 704, the control system 706, and the peripherals 708 by a system bus, network, and/or other connection mechanism (not shown).

The computer system 710 may be further configured to interact with and control one or more components of the propulsion system 702, the sensor system 704, the control system 706, and/or the peripherals 708. For example, the computer system 710 may be configured to control operation of the transmission 722 to improve fuel efficiency. As another example, the computer system 710 may be configured to cause the camera 734 to capture images of the environment. As yet another example, the computer system 710 may be configured to store and execute instructions corresponding to the sensor fusion algorithm 744. As still another example, the computer system 710 may be configured to store and execute instructions for displaying a display on the touchscreen 754. Other examples are possible as well.

As shown, the computer system 710 includes the processor 712 and data storage 714. The processor 712 may comprise one or more general-purpose processors and/or one or more special-purpose processors. To the extent the processor 712 includes more than one processor, such processors could work separately or in combination. Data storage 714, in turn, may comprise one or more volatile and/or one or more non-volatile storage components, such as optical, magnetic, and/or organic storage, and data storage 714 may be integrated in whole or in part with the processor 712.

In some embodiments, data storage 714 may contain instructions 716 (e.g., program logic) executable by the processor 712 to execute various vehicle functions, including those described above in connection with FIG. 1. Data storage 714 may contain additional instructions as well, including instructions to transmit data to, receive data from, interact with, and/or control one or more of the propulsion system 702, the sensor system 704, the control system 706, and the peripherals 708.

The computer system 702 may additionally or alternatively include components other than those shown.

As shown, the vehicle 700 further includes a power supply 760, which may be configured to provide power to some or all of the components of the vehicle 700. To this end, the power supply 760 may include, for example, a rechargeable lithium-ion or lead-acid battery. In some embodiments, one or more banks of batteries could be configured to provide electrical power. Other power supply materials and configurations are possible as well. In some embodiments, the power supply 760 and energy source 720 may be implemented together, as in some all-electric cars.

The vehicle 700 further includes a detection and classification system 770, having a perception system 772 and a feedback system 774. The detection and classification system 770 may be similar to the system 100 of FIG. 1, and be configured to perform any of the functions described above with respect to FIGS. 1-5.

In some embodiments, one or more of the propulsion system 702, the sensor system 704, the control system 706, and the peripherals 708 could be configured to work in an interconnected fashion with other components within and/or outside their respective systems, such as the detection system 770, for example.

Further, the vehicle 700 may include one or more elements in addition to or instead of those shown. For example, the vehicle 700 may include one or more additional interfaces and/or power supplies. Other additional components are possible as well. In such embodiments, data storage 714 may further include instructions executable by the processor 712 to control and/or communicate with the additional components.

Still further, while each of the components and systems are shown to be integrated in the vehicle 700, in some embodiments, one or more components or systems may be removably mounted on or otherwise connected (mechanically or electrically) to the vehicle 700 using wired or wireless connections.

The vehicle 700 may take other forms as well.

In some embodiments, the disclosed methods may be implemented as computer program instructions encoded on a non-transitory computer-readable storage media in a machine-readable format, or on other non-transitory media or articles of manufacture. FIG. 8 is a schematic illustrating a conceptual partial view of an example computer program product 800 that includes a computer program for executing a computer process on a computing device, arranged according to at least some embodiments presented herein.

In one embodiment, the example computer program product 800 is provided using a signal bearing medium 802. The signal bearing medium 802 may include one or more programming instructions 804 that, when executed by one or more processors, may provide functionality or portions of the functionality described above with respect to FIGS. 1-7.

In some embodiments, the signal bearing medium 802 may encompass a computer-readable medium 806, such as, but not limited to, a hard disk drive, a Compact Disc (CD), a Digital Video Disk (DVD), a digital tape, memory, etc. Further, in some embodiments the signal bearing medium 802 may encompass a computer recordable medium 808, such as, but not limited to, memory, read/write (R/W) CDs, R/W DVDs, etc. Still further, in some embodiments the signal bearing medium 802 may encompass a communications medium 810, such as, but not limited to, a digital and/or an analog communication medium (e.g., a fiber optic cable, a waveguide, a wired communications link, a wireless communication link, etc.). Thus, for example, the signal bearing medium 802 may be conveyed by a wireless form of the communications medium 810.

The one or more programming instructions 804 may be, for example, computer executable and/or logic implemented instructions. In some examples, a computing system such as the computing system 710 of FIG. 7 may be configured to provide various operations, functions, or actions in response to the programming instructions 804 being conveyed to the computing system 710 by one or more of the computer readable medium 806, the computer recordable medium 808, and/or the communications medium 810.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunctions with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A system in a vehicle, the system comprising:
   a display interface;
   a perception system configured to receive data indicative of a surrounding environment of the vehicle, and to classify one or more portions of the data as being representative of a particular type of object based on parameters associated with a machine learning classifier, wherein the data indicative of the surrounding environment comprises point cloud data that is representative of the object; and
   a feedback system configured to determine a confidence level associated with the classification by the perception system based on a relationship between features extracted from the point cloud data and expected characteristics of features for the particular type of object, to request via the display interface feedback from a user of the vehicle regarding the classification by the perception system responsive to determining that the confidence level is below a threshold, and to cause the parameters associated with the machine learning classifier to be modified based on information provided by the user in response to the request.

2. The system of claim 1, wherein the information provided in response to the request comprises an indication of a type of the object.

3. The system of claim 2, wherein based on the indication of the type of the object corresponding to the classification of the object by the perception system, the feedback system is configured to add the one or more portions of data to training data that is used to determine the parameters associated with the machine learning classifier.

4. The system of claim 1, wherein the vehicle is configured to operate in an autonomous mode.

5. The system of claim 1, further comprising one or more sensors configured to collect data about a surrounding environment of the vehicle.

6. The system of claim 5, wherein the one or more sensors comprise a laser scanner configured to determine the point cloud data that is representative of the object.

7. The system of claim 6, wherein the one or more sensors further comprise one or more of a camera and a radar.

8. The system of claim 1, wherein the machine learning classifier comprises a decision tree classifier.

9. A method comprising:
   receiving data about a surrounding environment of a vehicle from one or more sensors of the vehicle, wherein the data comprises point cloud data;
   determining, by a processor, one or more portions of the point cloud data that are representative of an object;
   determining, by the processor, a particular type of the object based at least on features extracted from the one or more portions of the point cloud data and parameters associated with a machine learning classifier;
   determining, by the processor, a confidence level associated with the determination of the type of the object based on a relationship between the features extracted from the one or more portions of the point cloud data and expected characteristics of features for the particular type of object; and
   responsive to determining that the confidence level is below a threshold, requesting via a display interface of the vehicle feedback from a user of the vehicle regarding the determination of the particular type of the object.

10. The method of claim 9, further comprising:
    receiving information from the user in response to the request, wherein the information comprises an indication of a type of the object; and
    based on the indication of the type of the object corresponding to the determination of the type of the object by the processor, adding the one or more portions of the point cloud data to training data that is used to determine the parameters associated with the machine learning classifier.

11. The method of claim 9, wherein the vehicle is configured to operate in an autonomous mode.

12. The method of claim 9, wherein the one or more sensors comprise a laser scanner configured to determine the point cloud data.

13. The method of claim 12, wherein the one or more sensors further comprise one or more of a camera and a radar.

14. The method of claim 9, wherein the machine learning classifier comprises a decision tree classifier.

15. A non-transitory computer-readable medium having stored therein instructions executable by a computing device to cause the computing device to perform functions comprising:

receiving data about a surrounding environment of a vehicle from one or more sensors of the vehicle, wherein the data comprises point cloud data;

determining one or more portions of the point cloud data that are representative of an object;

determining a particular type of the object based at least on features extracted from the one or more portions of the point cloud data and parameters associated with a machine learning classifier;

determining a confidence level associated with the determination of the particular type of the object based on a relationship between the features extracted from the one or more portions of the point cloud data and expected characteristics of features for the particular type of object; and responsive to determining that the confidence level is below a threshold, requesting via a display interface of the vehicle feedback from a user of the vehicle regarding the determination of the particular type of the object.

16. The non-transitory computer-readable medium of claim 15, wherein the functions further comprise receiving information in response to the request, wherein the information comprises an indication of a type of the object.

17. The non-transitory computer-readable medium of claim 16, wherein the functions further comprise based on the indication of the type of the object corresponding to the determined type of the object, adding the one or more portions of the point cloud data to training data that is used to determine the parameters associated with the machine learning classifier.

18. The non-transitory computer-readable medium of claim 15, wherein the machine learning classifier comprises a decision tree classifier.

* * * * *